United States Patent
Suenaga et al.

(10) Patent No.: US 6,881,685 B2
(45) Date of Patent: Apr. 19, 2005

(54) DEVICE AND METHOD FOR FEEDING TREATING AIR

(75) Inventors: Osamu Suenaga, Nirasaki (JP); Sadao Kobayashi, Tokyo (JP)

(73) Assignees: Tokyo Electron Limited (JP); Taisei Corporation (JP)

(*) Notice: Subject to any disclaimer, the term of this patent is extended or adjusted under 35 U.S.C. 154(b) by 93 days.

(21) Appl. No.: 10/250,911

(22) PCT Filed: Jan. 9, 2002

(86) PCT No.: PCT/JP02/00040
§ 371 (c)(1),
(2), (4) Date: Jul. 8, 2003

(87) PCT Pub. No.: WO02/055938
PCT Pub. Date: Jul. 18, 2002

(65) Prior Publication Data
US 2004/0035569 A1 Feb. 26, 2004

(30) Foreign Application Priority Data
Jan. 9, 2001 (JP) .................................. 2001-001684

(51) Int. Cl.[7] .......................... H01L 21/31; B01L 1/04
(52) U.S. Cl. ................. 438/795; 438/800; 165/228; 414/935; 454/187
(58) Field of Search ..................... 438/795, 800; 165/228; 414/935; 454/187; 62/93, 94

(56) References Cited

U.S. PATENT DOCUMENTS

| 6,547,660 B1 | * | 4/2003 | Suenaga et al. ............ 454/187 |
| 2002/0179283 A1 | * | 12/2002 | Suenaga et al. .............. 165/58 |
| 2003/0167781 A1 | * | 9/2003 | Thompson et al. .......... 62/117 |

FOREIGN PATENT DOCUMENTS

| JP | 04-254126 | 9/1992 |
| JP | 2000-18636 | 1/2000 |
| JP | 2000-39203 | 2/2000 |
| JP | 2000-205599 | 7/2000 |
| JP | 2001-176762 | 6/2001 |

* cited by examiner

Primary Examiner—Alexander Ghyka
(74) Attorney, Agent, or Firm—Finnegan, Henderson, Farabow, Garrett & Dunner, LLP

(57) ABSTRACT

An air-supply machine cleans outside air. The cleaned outside air is dehumidified by cooling by performing heat exchange between the cleaned outside air and an exhaust air from a lithography apparatus by a first heat-pipe. The dehumidified outside air is heated by performing heat treatment between the dehumidified outside air and an exhaust air from a vertical heat treatment apparatus by a second heat-pipe. The heated outside air is supplied to inside the housing of the vertical heat treatment apparatus. Thereby, the consumption of air in the clean room is reduced and the running cost of the clean room is reduced.

7 Claims, 4 Drawing Sheets

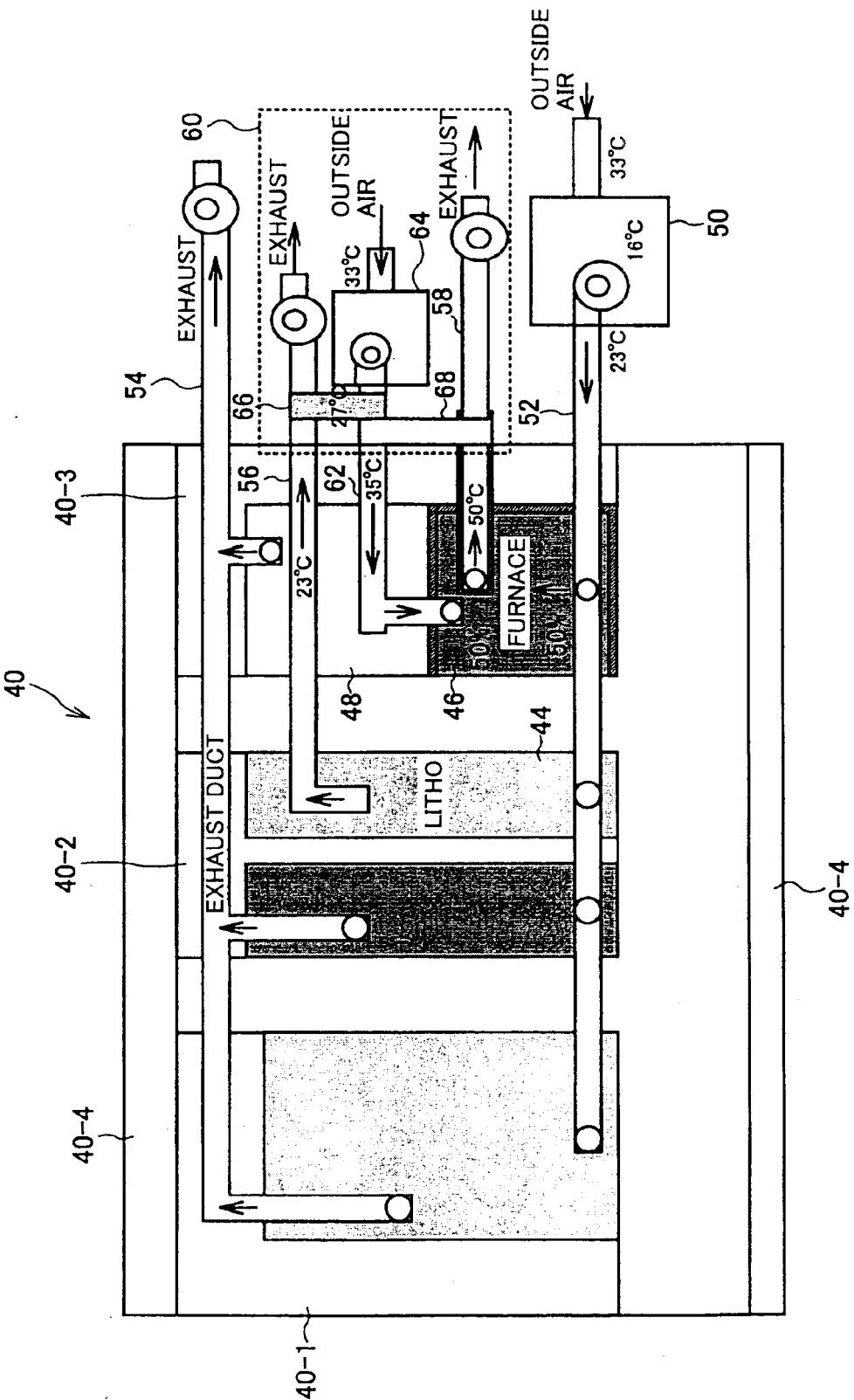

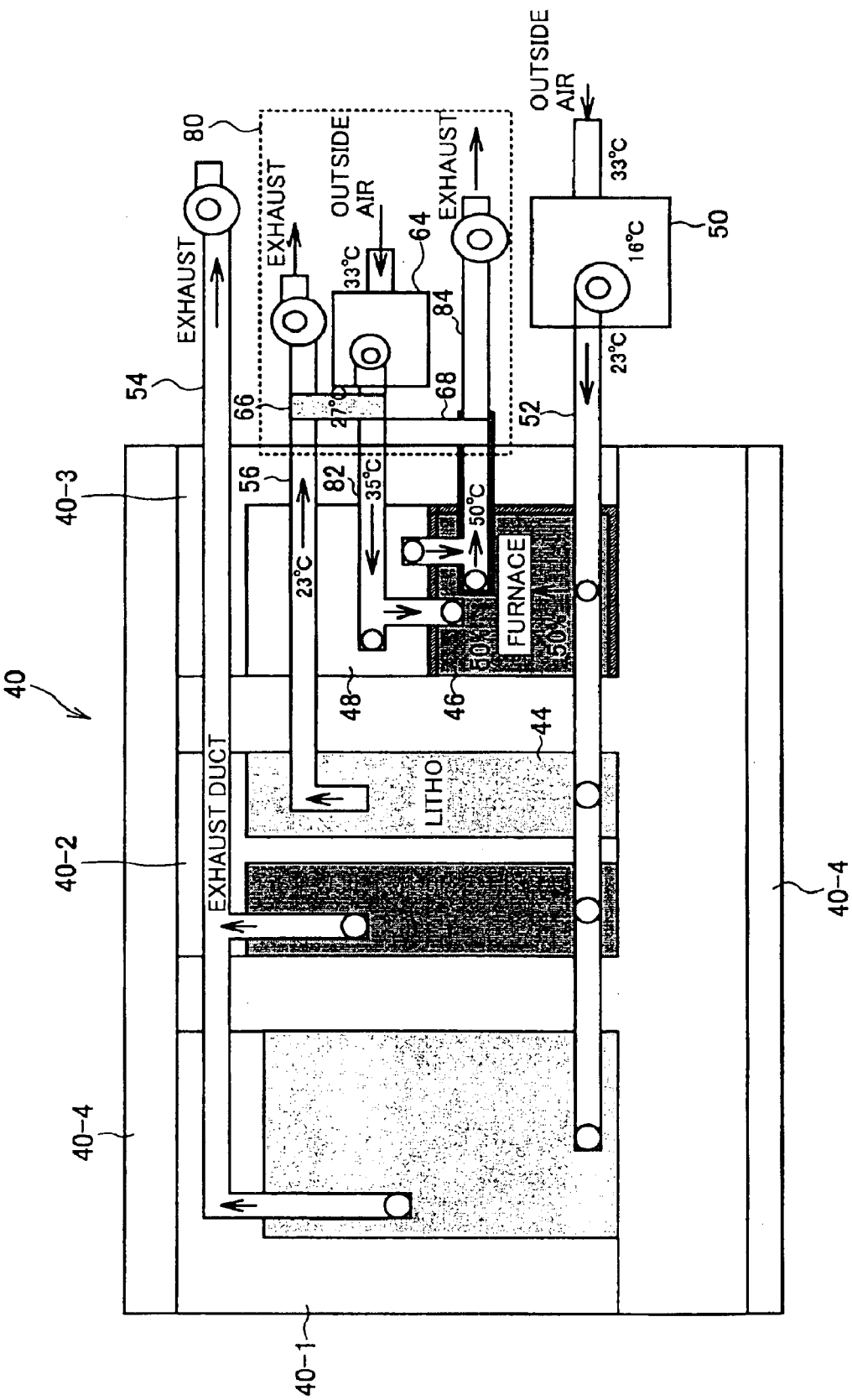

DEVICE AND METHOD FOR FEEDING TREATING AIR

TECHNICAL FIELD

The present invention relates to a treatment apparatus and method of air to be supplied to a clean room and, more particularly, to a treated-air supplying apparatus and method for treating air to be supplied to semiconductor manufacturing apparatuses installed in a clean room.

BACKGROUND ART

A clean room in which semiconductor manufacturing apparatuses are installed is supplied with a clean air which has controlled temperature and humidity and from which dusts are removed. Generally, semiconductor manufacturing apparatuses generate heat during operation, or generates various kinds of gas containing a toxic gas. For this reason, each of various semiconductor manufacturing apparatuses installed in a clean room is separately accommodated in a housing, and the air which circulated through an interior of the housing is directly exhausted out of the clean room through a duct or exhausted out of the clean room after removing a harmful gas (harmful component).

That is, the air in the clean room is introduced into the housing of the semiconductor manufacturing apparatus installed in the clean room. The air, which is warmed during circulation in the housing or in which a gas is mixed, is exhausted directly to outside the clean room.

Therefore, since all the air introduced into the clean room installed in the housing of the semiconductor manufacturing apparatus is exhausted out of the clean room, an amount of air corresponding to the amount of air exhausted from each semiconductor manufacturing apparatus must be produced and supplied to the clean room. The air supplied to the clean room is air which has been purified by a HEPA filter or the like, and has accurately controlled temperature and humidity.

An extremely large cost is required for manufacturing the air supplied to the clean room. That is, a running cost of a blower for moving air so as to purify outside air by passing through a filter, and an air-conditioning cost for cooling and heating air so as to control temperature and humidity are required.

As mentioned above, in an air-conditioning system of semiconductor manufacturing apparatuses in a conventional clean room, the costly air supplied to the clean room was exhausted out of the clean room through each semiconductor manufacturing apparatus. Thus, a clean air of which temperature and humidity are controlled was supplied to the clean room. The manufacturing cost of such an air newly supplied the clean room was a large factor which raises the running cost of a clean room.

DISCLOSURE OF INVENTION

It is a general object of the present invention to provide an improved and useful treated-air supplying apparatus and method in which the above-mentioned problems are eliminated.

A more specific object of the present invention is to provide a treated-air supplying apparatus and method which can reduce a running cost of a clean room by reducing an amount consumption of air in the clean room by supplying an air directly to a housing of a semiconductor manufacturing apparatus by applying a predetermined treatment to air outside the clean room.

In order to achieve the above-mentioned objects, there is provided according to one aspect of the present invention a treated-air supplying apparatus for supplying air, which has been subjected to a predetermined treatment, to semiconductor manufacturing apparatuses installed in a clean room, comprising: a first exhaust duct connected to a housing of a first semiconductor manufacturing apparatus which exhausts air having a temperature substantially equal to a temperature of air in the clean room; a second exhaust duct connected to a housing of a second semiconductor manufacturing apparatus which exhausts air having a temperature higher than a temperature of air in the clean room; an air-supply duct supplying air to inside of the housing of the second semiconductor manufacturing apparatus; an outside-air supplying machine connected to the air-supply duct for cleaning air outside the clean room and supplying the air to the air-supply duct; a first heat exchanger provided between the first exhaust duct and the air-supply duct for dehumidifying by cooling the air supplied from the outside-air supplying machine by performing heat-exchange between the air in said first exhaust duct and the air in the air-supply duct; and a second heat exchanger provided between the second exhaust duct and the air-supply duct for heating the air dehumidified by the first heat exchanger by performing heat-exchange between the air in the second exhaust duct and the air in the air-supply duct.

In the treated-air supplying apparatus according to the present invention, the first semiconductor manufacturing apparatus is preferably a lithography apparatus. Additionally, the second semiconductor manufacturing apparatus is preferably a heat treatment apparatus. Additionally, in the treated-air supplying apparatus according to the present invention, a cleaning apparatus may be located in the vicinity of the heat treatment apparatus, and wherein the air-supply duct may be connected to both the heat treatment apparatus and the cleaning apparatus, and the second exhaust duct may be connected to both the heat treatment apparatus and the cleaning apparatus.

Additionally, there is provided according to another aspect of the present invention a treated-air supplying method for supplying air, which has been subjected to a predetermined treatment, to a semiconductor manufacturing apparatus installed in a clean room and exhausting an air having a temperature higher than a temperature of air inside the clean room, comprising: a step of taking air from outside the clean room; a step of heating the air taken from outside the clean room by performing heat-exchange between the air taken from outside the clean room and an exhausted air from the semiconductor manufacturing apparatus installed in the clean room; and a step of supplying the heated air taken from outside the clean room to inside the housing of the semiconductor manufacturing apparatus.

The treated-air supplying method according to the present invention may further comprise a step of dehumidifying by cooling the air taken from outside the clean room by performing heat-exchange between the air taken from outside the clean room and an air exhausted from a semiconductor manufacturing apparatus which exhaust air having a temperature substantially equal to a temperature of air inside the clean room before heating the air taken from outside the clean room. Additionally, the heat exchange of the air taken from outside the clean room may be performed by using a heat-pipe.

According to the treated-air supplying apparatus and method, the air outside the clean room is subjected to a predetermined treatment, and, thereafter, the treated air is directly supplied to a semiconductor manufacturing apparatus which exhausts an air having a temperature higher than the clean room air. The predetermined treatment is heating or cooling of air, and is carried out by heat exchange between the air to be supplied and the air exhausted from the semiconductor manufacturing apparatus. Therefore, an electric power required for processing the air supplied to the semiconductor manufacturing apparatus is only an electric power required for the fan for supplying air, and, thus, an amount of electric power consumption for heating or cooling can be reduced. By using a heat-pipe for the heat exchange for heating or cooling, an efficient heat exchange can be achieved and a necessary supply-air flow can be acquired.

Other objects, features and advantages of the present invention will become more apparent from the following detailed description when read in conjunction with the accompanying drawings.

BRIEF DESCRIPTION OF THE DRAWINGS

FIG. 3 is an illustrative plan view showing a structure of a clean room provided with a treated-air supplying apparatus according to a first embodiment of the present invention.

FIG. 4 is an illustrative plan view showing a structure of a clean room provided with a treated-air supplying apparatus according to a second embodiment of the present invention.

BEST MODE FOR CARRYING OUT THE INVENTION

Figure 1:
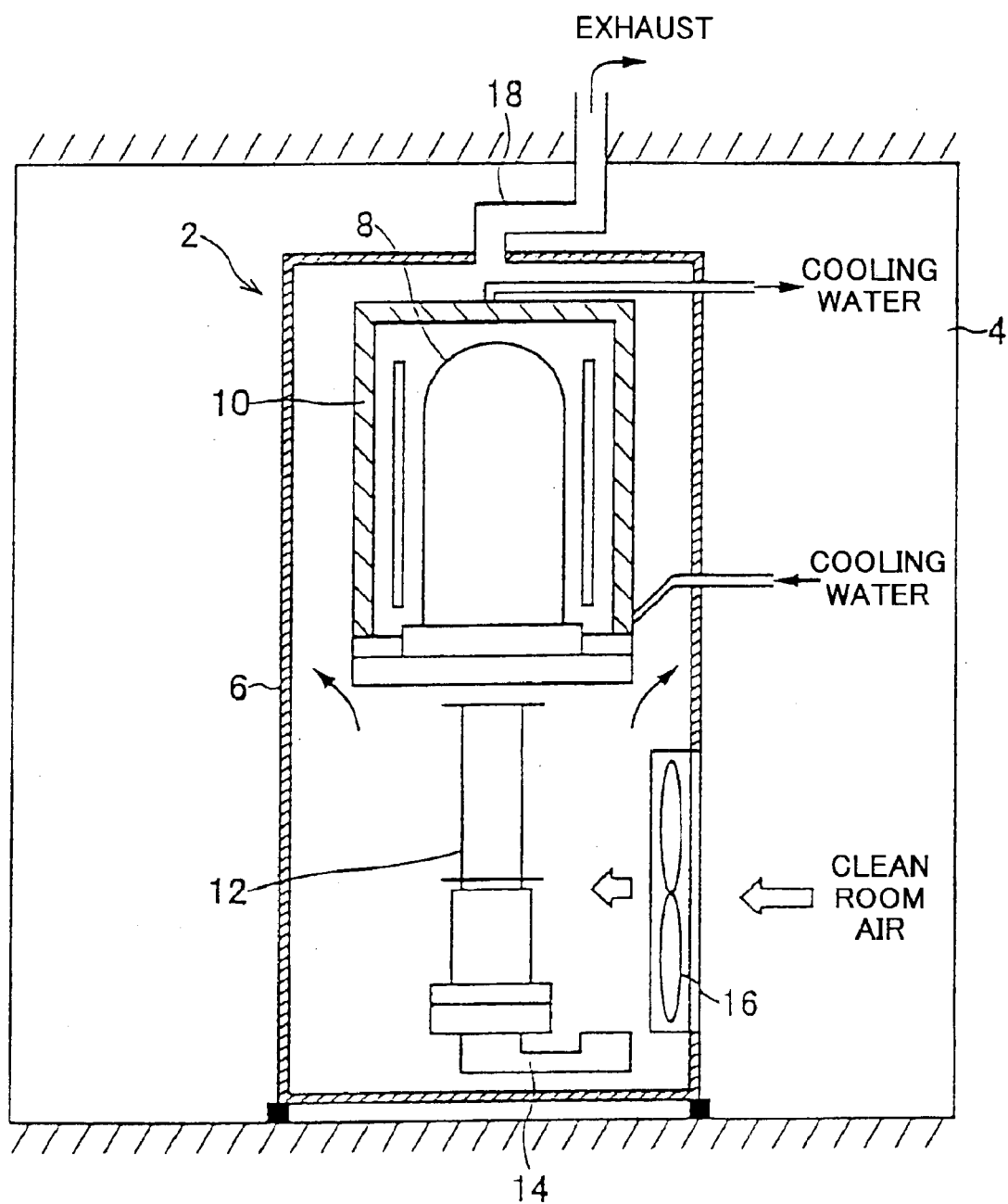
FIG. 1 is an illustration showing a structure of a vertical heat treatment apparatus.

A description will be given below, with reference to the drawings, of embodiments according to the present invention. It should be noted that the same parts in the drawings are give the same reference numbers.

First, a description will be given of the state of air exhausted from a semiconductor manufacturing apparatus installed in a clean room. A process of manufacturing a semiconductor contains various processes such as a wafer washing process, a heat treatment process, an impurity doping process, a thin-film formation process, an etching process, etc. Each process is performed by an individual apparatus installed in a clean room. Therefore, an air of various states is exhausted from each semiconductor manufacturing apparatus installed in the clean room. That is, although the air in the same clean room is supplied to each semiconductor manufacturing apparatus installed in the clean room, air having different temperature and humidity is exhausted from each semiconductor manufacturing apparatus.

For example, a heating apparatus for heat-treating a semiconductor wafer has a heating furnace which heats the semiconductor wafer up to 1,000° C., and emits a large amount of heat in the atmosphere during a heating process and when taking out a heat-treated product (wafer). FIG. 1 is an illustration showing a structure of a vertical heat treatment apparatus which is widely used in heat treatment of semiconductor wafers.

In FIG. 1, a vertical heat treatment apparatus 2 is installed in a clean room 4. The vertical heat treatment apparatus 2 has a housing 6, and a heating furnace 8 is accommodated in the housing 6. The heating furnace 8 is cooled by a cooling apparatus 10 which uses cooling water. A conveyance mechanism 14 for taking a semiconductor wafer 12 to be processed in and out of the heating furnace 8 is provided under the heating furnace 8. A fun 16 is provided in a lower part of the housing 6 so as to introduce air in the clean room 4 into inside the housing 6. The air in the clean room introduced into the housing 6 passes inside of the housing 6, enters an exhaust duct 18 provided on the top part of the housing 6, and is exhausted out of the clean room through the exhaust duct 18.

In the vertical heat treatment apparatus 2 having the above-mentioned structure, a part of heat from the heating furnace 8 is emitted to the periphery of the heating furnace 8, and, thus, a temperature of the surrounding air is raised. Additionally, when taking the heat-treated semiconductor wafer 12 out of the heating furnace 8, a large amount of heat is emitted to the exterior of the heating furnace 8. Since the heat-treating temperature of the semiconductor wafer 12 is as high as about 1,000° C., the air inside the housing 6 becomes 30° C.–55° C. even if the heating furnace 8 is cooled by the cooling apparatus 10. Therefore, the air of 30° C.–55° C. is exhausted out of the clean room through the exhaust duct 18.

As mentioned above, an air having a higher temperature than a clean room air is exhausted from the heat treatment apparatus.

Next, a lithography apparatus is one of the semiconductor manufacturing apparatuses which exhaust air of a temperature without much change from the temperature of a clean room air. The lithography apparatus is an apparatus which forms a mask on a semiconductor wafer by photoresist, and forms a film of a desired pattern by etching. The lithography apparatus contains a coater for applying photoresist and a developer for developing the exposed photoresist.

Generally, in the process performed in the coater and developer, the photoresist containing an organic solvent is used. Therefore, the organic solvent contained in the photoresist evaporates and is diffused into surrounding air. In order to remove the organic solvent diffused into the air, the air in the lithography apparatus is exhausted out of the clean room.

In the application process of photoresist by the coater, it is necessary to accurately control temperature and humidity since the viscosity of the organic solvent is dependent on an ambient temperature and humidity. Generally, the air in the clean room is maintained constant so that the temperature becomes 23° C. and the humidity becomes 45%. Therefore, generally, the air temperature in the lithography apparatus is maintained constant at 23° C. Additionally, since the evaporation rate of the organic solvent is dependent on an ambient temperature and humidity, the air humidity in the lithography apparatus is also maintained constant at 45%.

The coater and developer are parts of the lithography apparatus, and are accommodated in the housing of the lithography apparatus. Although the air in the clean room is supplied to the lithography apparatus as is in the above-mentioned heat treatment apparatus, the air to be supplied is supplied to the lithography apparatus after being processed again by a temperature and humidity controlling machine for the lithography apparatus so as to accurately maintain the temperature and humidity of the air in the housing.

Figure 2:
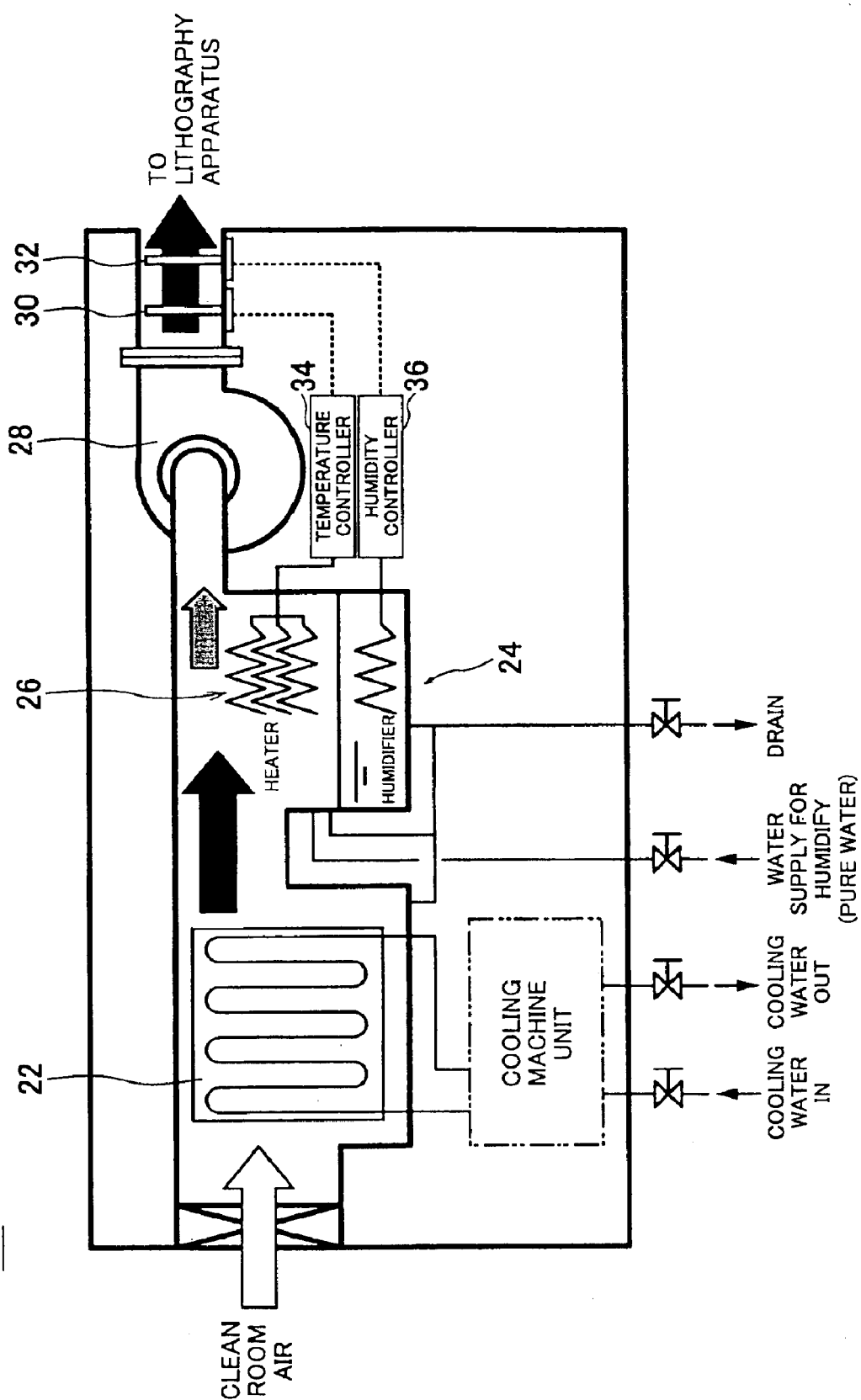
FIG. 2 is an illustrative structural diagram showing an entire structure of a temperature-and-humidity-controlling machine for a lithography apparatus.

FIG. 2 is a illustration showing the entire structure of a temperature and humidity controlling machine 20 for lithography apparatuses. The air of the clean room is first cooled by a cooler 22 so as to remove moisture in the air. The air of a low temperature and low humidity which passed through the cooler 22 is heated and humidified by a humidifier 24 and a heater 26, and generally the temperature and humidity are adjusted to be 23° C. and 45%, and further the variation in the temperature and the humidity is adjusted to be extremely small. The humidifier 24 and the heater 26 are constituted by electric heaters.

The air having the adjusted temperature and humidity is supplied by a fan 28 to the housing of the lithography apparatus. An outlet of the fan 28 is provided with a temperature sensor 30 and a humidity sensor 32 so that a temperature detection result and a humidity detection result are supplied to a temperature controller 34 and a humidity controller 36, respectively. The temperature controller 34 and the humidity controller 36 control an electric power supplied to the humidifier 24 and the heater 26 so that the temperature and humidity of the air become 23° C. and 45% accurately.

Therefore, the air having the adjusted temperature of 23° C. and the adjusted humidity of 45% is supplied to the lithography apparatus, and is exhausted out of the clean room through an exhaust duct. There is no large heat source in the lithography apparatus as compared to the above-mentioned heat treatment apparatus, and the temperature of the air exhausted from the lithography apparatus ranges from 23° C. to 28° C. and the humidity ranges from 45% to 50%.

Accordingly, the temperature of the air exhausted from the lithography apparatus is much lower than the temperature of the exhausted from the above-mentioned heat treatment apparatus. Thus, the inventors of the present invention considered that an amount of a costly clean room air consumed by a heat treatment apparatus can be reduced by processing the air supplied to the heat treatment apparatus by utilizing a temperature difference between the exhaust air from the heat treatment apparatus and the exhaust air from the lithography apparatus.

Next, a description will be given, with reference to FIG. 3, of a first embodiment of the present embodiment. FIG. 3 is an illustrative plan view showing a structure of a clean room in which a treated-air supplying apparatus according to the first embodiment of the present invention is installed. In FIG. 3, a part enclosed by dotted lines corresponds to the treated-air supplying apparatus 60.

The clean room 40 is divided into a plurality of spaces 40-1, 40-2 and 40-3 by partitions, and a semiconductor manufacturing apparatus is installed in each space. A lithography apparatus 44 is installed in the space 40-2, and a vertical heat treatment apparatus 46 and a washing apparatus 48 are installed in the space 40-3. Generally, a washing apparatus is located in the vicinity of a heat treatment apparatus.

In the clean room 40, ducts 42 are provided on both sides so as to circulate the air inside the clean room. The air supplied to the clean room 40 is processed by an external air-conditioning machine 50. The external air-conditioning machine 50 is provided with filters (including a HEPA filter) which carries out cleaning of the outside air, and the dust of the taken-in outside air is removed by the filters. The temperature and humidity of the cleaned outside air are adjusted by the same manner as the temperature and humidity control machine shown in FIG. 2. However, when heating, an electric heater is not used but steam or warm water is used in many cases. That is, for example, when an outside temperature is 33° C., the cleaned outside air is cooled at 16° C. so as to be dehumidified and, thereafter, is heated at 23° C. and humidified so that the humidity becomes 45%. Therefore, a cooling means such as a cooling machine and a heating means such as an electric heater or a heat exchanger are incorporated into the external air-conditioning machine 50.

The cleaned outside air of which temperature is set to 23° C. and humidity is set to 45% is supplied, as clean room air, to the clean room 40 through a clean room air supply duct 52.

The exhaust air from semiconductor manufacturing apparatuses other than the lithography apparatus 44 and the vertical heat treatment apparatus 46 is exhausted out of the clean room 40 through an exhaust duct 54. The exhaust air from the lithography apparatus 44 is exhausted out of the clean room 40 through an exhaust duct 56 which is separate from the exhaust duct 54. Additionally, the exhaust air from the vertical heat treatment apparatus 46 is exhausted out of the clean room 40 through an exhaust duct 58.

Next, a description will be given of a treated-air supplying apparatus 60 according to the present embodiment. It should be noted that, in the present embodiment, a partially treated air means not a clean air such as a clean room air of which temperature and humidity are completely adjusted to 23° C. and 45% but a clean air of which temperature and humidity are roughly adjusted as mentioned later. Different from the partially treated air, the air supplied to the clean room, that is, the clean air of which temperature is adjusted to 23° C. and humidity is adjusted to 45% is referred to as a completely treated air.

The treated-air supplying apparatus 60 according to the present embodiment has an air-supply duct 62 connected to the vertical heat treatment apparatus 46. An air supplier 64 is connected to the air-supply duct 62. Similar to the external air-conditioning machine 50 which produces a clean room air, the air supplier 64 carries out cleaning of outside air by filters, and supplies a clean air into the air-supply duct 62. However, unlike the external air-conditioning machine 50, the air supplier 64 does not have a function to control the temperature and humidity of the cleaned outside air. That is, the air supplier 64 does not have a cooling apparatus such as a refrigerating machine and a heating source such as a heater, and supplies a clean air, which is clean in such a degree that dusts in the outside air are removed and can be introduced into the clean room, to the air-supply duct 62 as it is.

In the vicinity of the air supplier 64, a first heat-pipe 66 as a heat exchanger is provided between the air-supply duct 62 and the exhaust duct 56 extending from the lithography apparatus 44. The first heat-pipe 66 is provided for the purpose of dehumidifying by cooling the air supplied from the air supplier 64. Additionally, on the side of the heat treatment apparatus 46 at the location of the heat-pipe 66, a second heat pipe 68 as a heat exchanger is provided between the air-supply duct 62 and the exhaust duct 58. The second heat pipe 68 is provided for the purpose of heating the air, which is supplied from the air supplier 64 and is dehumidified by the first heat-pipe.

Now, it is assumed that the temperature of the outside air is 33° C. and the relative humidity is 90%. In such a case, if the outside air is cleaned and is supplied to the vertical heat treatment apparatus 46 through the air-supply duct 62 as it is, there may be a case where dew condensation occurs at an inner surface of the air-supply duct 62. That is, since the inside of the clean room is maintained at 23° C., the inner surface of the air-supply duct 62 is also at a temperature close to 23° C., while the temperature of the air passing through the air-supply duct 62 is 33° C. and the relative humidity is 90%. Accordingly, the moisture in the air in contact with the inner surface of the air-supply duct 62 forms dews on the inner surface.

In order to solve the problem of such dew condensation, in the present embodiment, the air of 33° C. supplied from the air supplier 64 is dehumidified by cooling down to 27° C. by the first heat-pipe 66. An end of the first heat-pipe is connected to the exhaust duct 56 extending from the lithography apparatus, and the other end is connected to the air-supply duct 62. Since the exhaust air from the lithography apparatus 44 is always at 23° C., a difference in temperature between opposite ends of the first heat-pipe 66 becomes about 10° C. (33–23=10), and the heat exchange by the heat pipe can be performed efficiently.

Since the relative humidity of the air of 27° C., which has been dehumidified by cooling by the first heat-pipe 66, is 100% as it is, it is necessary to heat again so as to lower the relative humidity. For this reason, in the present embodiment, the air which has been dehumidified by cooling by the first heat-pipe 66 is heated by carrying out a heat exchange with the exhaust air from the vertical heat treatment apparatus 46 by using the second heat-pipe 68. That is, the exhaust air from the vertical heat treatment apparatus 46 is at about 50° C. on the average, and a difference in temperature between the 27° C.-air which has been dehumidified by cooling by the first heat-pipe 66, is about 23 degrees. With such a temperature difference, a heat-pipe can perform a heat exchange efficiently.

The 27° C.-air, which has been dehumidified by cooling by the first heat-pipe 66, is heated at 35° C. by the heat exchange by the second heat pipe 68. By this heating, the relative humidity of the air passing through the inside of the air-supply duct 62 decreases to a relative humidity of a level at which no dew condensation occurs even if the air contacts the inner surface of the air-supply duct 62.

The thus-produced air (partially treated air) is supplied to the vertical heat treatment apparatus 46 through the air-supply duct 62, and is exhausted out of the clean room 40 through the exhaust duct 58 after being heated to about 50° C. by absorbing heat emitted from the vertical heat treatment apparatus 46.

It should be noted that the dehumidification effect according to the first heat-pipe is reduced as the temperature of the outside air becomes close to 23° C. However, since there is no possibility of due condensation if the difference between the temperature of the outside air and the temperature of the air inside the clean room, there is no problem that dehumidification is not required. On the other hand, if the temperature of outside air is much lower than the temperature of the air inside the clean room, it is possible that due condensation occurs on the outer side of the air-supply duct 62. However, in the present embodiment, since partially treated air is always heated to some extent by the second heat-pipe 68, the problem of such dew condensation does not occur.

As mentioned above, in the present embodiment, the air produced by the treated-air supplying apparatus 60 is supplied to the vertical heat treatment apparatus 46 instead of the completely treated air to be supplied to the clean room. In order to produce the partially treated air, only the power of a fan in the air supplier 64 is needed. That is, since the dehumidification and reheating can be achieved by the heat exchange by the first and second heat-pipes, the dehumidification and reheating can be achieved without using a refrigerating machine and a heater, and, thus, the air supplied to the vertical heat treatment apparatus can be produced at a much lower cost than the completely treated air being used.

Here, in the present embodiment, the air supplied to the vertical heat treatment apparatus 46 contains 50% of the partially treated air and 50% of the completely treated air. That is, an amount of the partially treated air which can be produced depends on the 23° C.-air exhausted from the lithography apparatus 44, and the whole amount of air to be supplied to the vertical heat treatment apparatus 46 cannot be produced solely by the partially treated air. Although the ratio of the partially treated air to the completely treated air is not limited to the above-mentioned value and any ratio can be used, it is preferable that the partially treated air be 100%.

Next, a description will be given, with reference to FIG. 4, of a second embodiment of the present invention. FIG. 4 is an illustrative plan view showing a structure of a clean room in which a treated-air supply apparatus according to the second embodiment of the present invention is installed. In FIG. 4, a part enclosed by dotted lines corresponds to the treated-air supplying apparatus 80 according to the second embodiment of the present invention. In FIG. 4, parts that are the same as the parts shown FIG. 3 are given the same reference numerals, and descriptions thereof will be omitted.

The treated-air supplying apparatus 80 according to the present embodiment is constituted by replacing the air-supply duct 62 and the exhaust duct 58 shown in FIG. 3 with an air-supply duct 82 and an exhaust duct 84, respectively, and other structure is the same as that shown in FIG. 3.

That is, in the treated-air supplying apparatus 80 according to the present embodiment, the air-supply duct 82 is connected not only to the vertical heat treatment apparatus 46 but also to the washing apparatus 48 which is located in the vicinity of the vertical heat treatment apparatus 46. Therefore, the treated-air supplying apparatus 80 is constituted so as to supply the partially treated air also to the washing apparatus 48. Additionally, the exhaust duct 58 is connected not only to the vertical heat treatment apparatus 46 but also to the washing apparatus 48. Therefore, the exhaust air from the washing apparatus 48 is also exhausted through the exhaust duct 84.

Since the washing apparatus 48 washes semiconductor wafers by warm water, the temperature inside the washing apparatus 48 is relatively high. Therefore, it is necessary to cool the washing apparatus 48 as well as the vertical heat treatment apparatus 46. In the present embodiment, it is constituted to use the partially treated air also for cooling the washing apparatus 48. Additionally, the temperature of the air exhausted from the washing apparatus 48 is comparatively high, and, for example, about 60° C.-air is exhausted. Therefore, if the air exhausted from the washing apparatus 48 is exhausted through the exhaust duct 64, it can be used for reheating the supply air by the second heat-pipe.

An attempt was made to calculate an amount of electric power, which can be saved in the present embodiment, in a case where the partially treated air is 70% and the completely treated air is 30%. That is, a comparison was made between a case where the air supplied to the vertical heat treatment apparatus 46 and the washing apparatus 48 is made into 100% of completely treated air and a case where the partially treated air is used by 70%.

As the results of calculation, it was appreciated that power consumption for producing the air to be supplied to the vertical heat treatment apparatus 46 and the washing apparatus 48 is reduced from 1,900,000 kWh/y to 950,000 kWh/y, which is a reduction of 950,000 kWh/y. It should be noted that, in the above-mentioned embodiments, the heat exchange is performed by using the first and second heat-pipes, the heat-pipe is not necessarily used, and conventional heat exchanger may be used.

Additionally, although the exhaust air from the lithography apparatus is used as the air having a relatively low and constant temperature, such an apparatus is not limited to a lithography apparatus, and, for example, an exhaust air from an apparatus having no heat source or an exhaust air from a measuring instrument room or storage room in a clean room may be used. In an above-mentioned embodiment, the reason for using the exhaust air from the lithography apparatus is that the temperature of the exhaust air from the lithography apparatus has is always constant and the amount thereof is large.

The present invention is not limited to the above-mentioned specifically disclosed embodiments, and variations and modifications may be made within the scope of the present invention.

What is claimed is:

1. A treated-air supplying apparatus for supplying air, which has been subjected to a predetermined treatment, to semiconductor manufacturing apparatuses installed in a clean room, comprising:
   a first exhaust duct connected to a housing of a first semiconductor manufacturing apparatus which exhausts air having a temperature substantially equal to a temperature of air in the clean room;
   a second exhaust duct connected to a housing of a second semiconductor manufacturing apparatus which exhausts air having a temperature higher than a temperature of air in the clean room;
   an air-supply duct supplying air to inside of the housing of said second semiconductor manufacturing apparatus;
   an outside-air supplying machine connected to said air-supply duct for cleaning air outside the clean room and supplying the air to said air-supply duct;
   a first heat exchanger provided between said first exhaust duct and said air-supply duct for dehumidifying by cooling the air supplied from said outside-air supplying machine by performing heat-exchange between the air in said first exhaust duct and the air in said air-supply duct; and
   a second heat exchanger provided between said second exhaust duct and said air-supply duct for heating the air dehumidified by said first heat exchanger by performing heat-exchange between the air in said second exhaust duct and the air in said air-supply duct.

2. The treated-air supplying apparatus as claimed in claim 1, wherein said first semiconductor manufacturing apparatus is a lithography apparatus.

3. The treated-air supplying apparatus as claimed in claim 1 or 2, wherein said second semiconductor manufacturing apparatus is a heat treatment apparatus.

4. The treated-air supplying apparatus as claimed in claim 3, wherein a cleaning apparatus is located in the vicinity of said heat treatment apparatus, and wherein said air-supply duct is connected to both said heat treatment apparatus and said cleaning apparatus, and said second exhaust duct is connected to both said heat treatment apparatus and said cleaning apparatus.

5. A treated-air supplying method for supplying air, which has been subjected to a predetermined treatment, to a semiconductor manufacturing apparatus installed in a clean room and exhausting an air having a temperature higher than a temperature of air inside the clean room, comprising:
   a step of taking air from outside the clean room;
   a step of heating the air taken from outside the clean room by performing heat-exchange between the air taken from outside the clean room and an exhausted air from said semiconductor manufacturing apparatus installed in the clean room; and
   a step of supplying the heated air taken from outside the clean room to inside the housing of said semiconductor manufacturing apparatus.

6. The treated-air supplying method as claimed in claim 5, further comprising a step of dehumidifying by cooling the air taken from outside the clean room by performing heat-exchange between the air taken from outside the clean room and an air exhausted from a semiconductor manufacturing apparatus which exhaust air having a temperature substantially equal to a temperature of air inside the clean room before heating the air taken from outside the clean room.

7. The treated-air supplying method as claimed in claim 5 or 6, wherein the heat exchange of the air taken from outside the clean room is performed by using a heat-pipe.

* * * * *